United States Patent [19]
Sauer

[11] Patent Number: 5,620,799
[45] Date of Patent: Apr. 15, 1997

[54] ELECTROMAGNETIC RADIATION PERMEABLE GLAZING

[75] Inventor: Gerd Sauer, Stolberg, Germany

[73] Assignee: Saint-Gobain Vitrage, Courbevoie, France

[21] Appl. No.: 529,570

[22] Filed: Sep. 18, 1995

[30] Foreign Application Priority Data

Sep. 16, 1994 [DE] Germany .......................... 44 33 051.0

[51] Int. Cl.⁶ ..................................................... B32B 9/00
[52] U.S. Cl. ........................... 428/426; 428/38; 428/46; 428/192; 428/210; 428/425.6; 428/432; 428/437; 428/913; 359/270; 359/273; 359/275; 52/171.3; 52/788.1; 52/173.3
[58] Field of Search .............................. 428/437, 34, 913, 428/432, 192, 426, 38, 46, 49, 210, 241, 425.6; 359/270, 275, 273; 52/171, 788, 173 R, 304

[56] References Cited

U.S. PATENT DOCUMENTS

| | | |
|---|---|---|
| 5,091,258 | 2/1992 | Moran ..................................... 428/437 |
| 5,099,621 | 3/1992 | Schacklette et al. ..................... 52/171 |
| 5,111,329 | 5/1992 | Gajewski et al. ........................ 359/275 |
| 5,197,242 | 3/1993 | Baughman et al. ...................... 52/171 |

*Primary Examiner*—Patrick Ryan
*Assistant Examiner*—Abraham Bahta
*Attorney, Agent, or Firm*—Oblon, Spivak, McClelland, Maier & Neustadt, P.C.

[57] ABSTRACT

A glazing for an enclosed space includes at least one sheet of glass having a precisely delimited surface region and a transmitter and/or a receiver for electromagnetic radiation in a non-visible portion of the spectrum. The transmitter and/or receiver are positioned for respectively transmitting and receiving radiation in a non-visible portion of the spectrum via the precisely delimited surface region. The transmissivity of said precisely delimited surface region for electromagnetic radiation in said non-visible portion of the spectrum is higher than that of a remainder of the at least one sheet of glass for electromagnetic radiation in the non-visible portion of the spectrum.

8 Claims, 2 Drawing Sheets

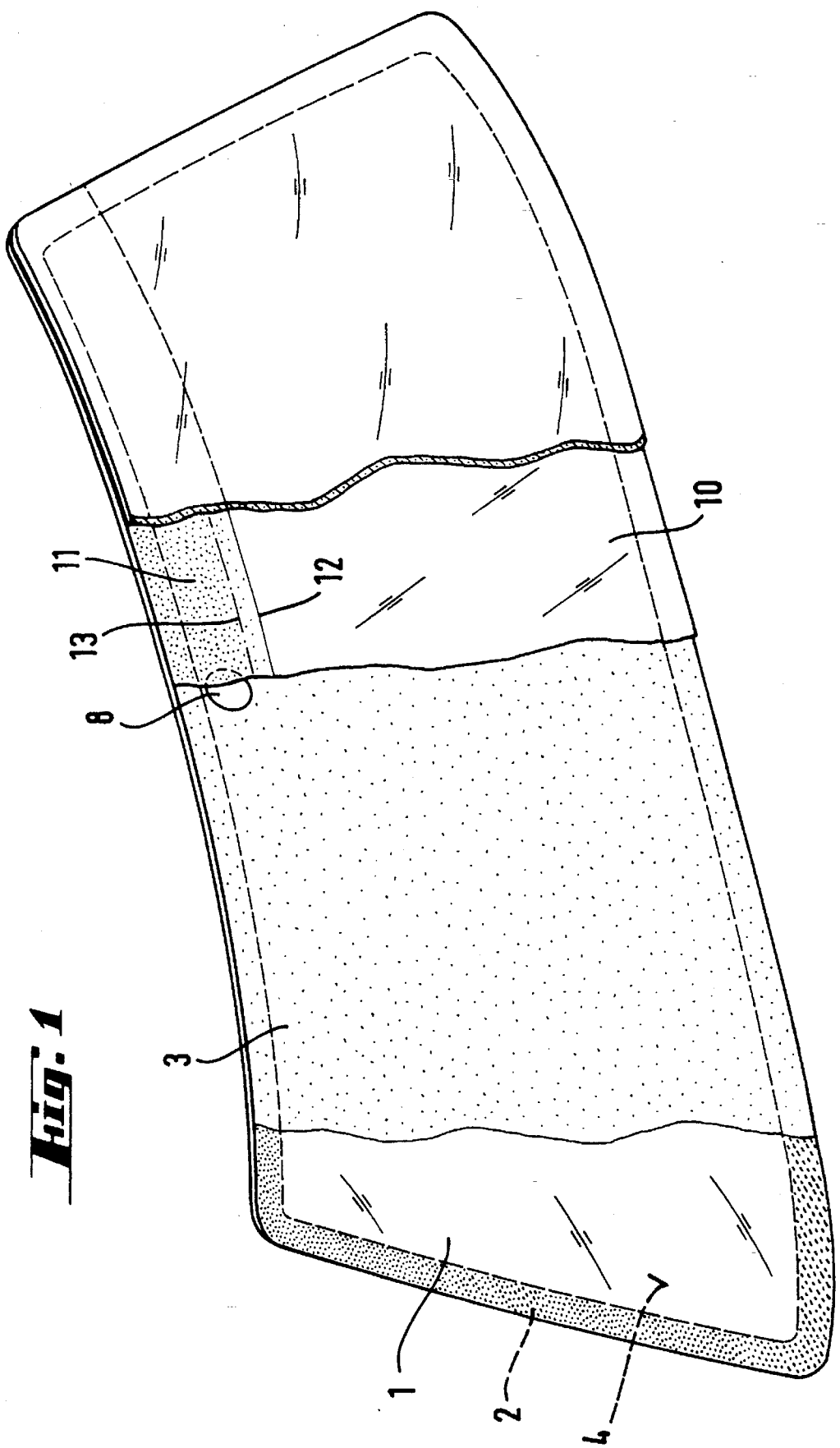

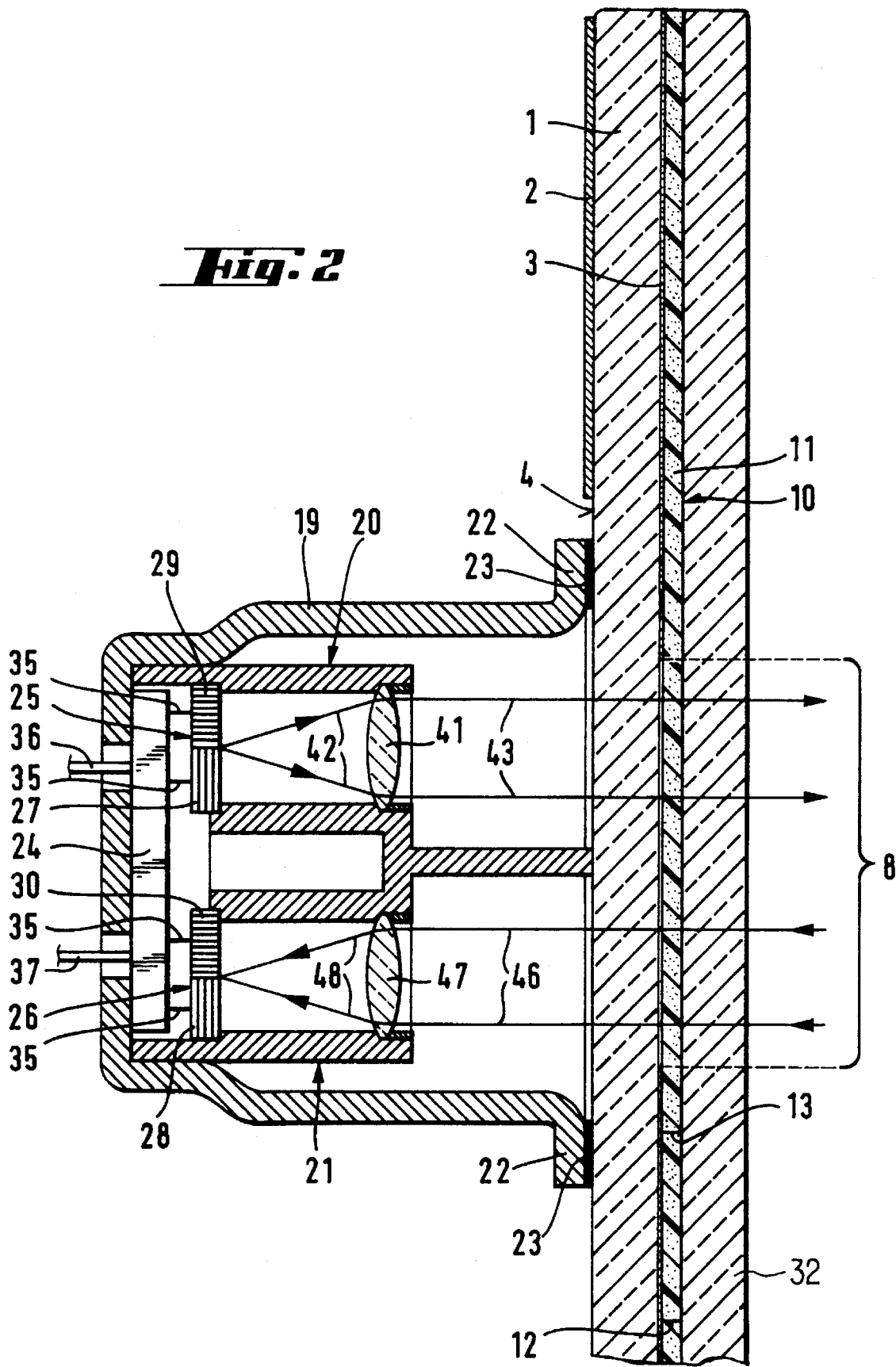

ELECTROMAGNETIC RADIATION PERMEABLE GLAZING

BACKGROUND OF THE INVENTION

1. Field of the Invention

The invention relates to glazings for an enclosed space and having at least one sheet of glass, including a transmitter and/or a receiver adapted for transmission and/or receipt of electromagnetic radiation traversing the glass, the radiation being in a non-visible portion of the spectrum.

2. Description of the Related Art

It is known to provide signal and data transmission, using electromagnetic radiation in the non-visible portion of the spectrum, for a large variety of applications such as vehicles or buildings. Thus, for example, it is known to use infrared transmitters and receivers to control alarm systems or catches from a distance. In automotive vehicles this enables information to be transmitted relating to traffic situations, the position of the vehicle, communication with toll systems or calculating the separation of one vehicle from others. For buildings, it enables the detection of approaching people.

For such applications it is possible to use microwave or ultraviolet transmitters and receivers. Microwave technology enables many other functions to be carried out, for example by radio telephone in a digital network, digital broadcasting, by satellite or otherwise, as well as vehicle location by satellite remote detection, for example by global position system (GPS).

EP 0 312 788 B1 describes a device having a light transmitter and receiver, both located within a vehicle, the transmitter being arranged so that the light it produces traverses the windscreen and is diffused out of the vehicle while the receiver is disposed so that it can detect and interpret the light transmitted from outside the vehicle and which traverses the windscreen. This device preferable uses infrared radiation.

For such known devices, one uses a glazing which is sufficiently transparent to the electromagnetic radiation to be used. However, it may be undesirable for outside radiation to penetrate to the inside of the space enclosed by this glazing. Such radiation could, for example, prove annoying or harmful to the occupants of the enclosed space. Furthermore, the exraneous radiation passing through the glazing can strike the receiver from different directions, causing an undesirable reduction in the signal/noise ratio.

SUMMARY OF THE INVENTION

It is therefore an object of the invention to provide a glazing which enables a reduction of possible perturbations to which a receiver fitted within an enclosed space might be subjected.

It is a further object of the invention to provide a glazing which can block or prevent undesirable radiation from intruding into the enclosed space without prejudicing the efficiency of the transmitter/receiver or the transparency of the glazing to radiation from the transmitter.

The above and other objects can be achieved according to the invention by a glazing having at least one sheet of glass having, except for a delimited surface area providing for the passage of electromagnetic radiation, a high reflective capability and/or ability to absorb radiation, i.e., a low transmissivity, for the wavelength of the transmitter and/or receiver.

The glazing according to the invention therefore has surface zones provided with different properties of reflection and transmission, so that it only has good transmissivity in a reduced area chosen precisely for that part of the radiation spectrum which allows data to be transmitted, whereas, over the rest of the surface, the same radiation is substantially prevented from passing by being reflected and/or absorbed. In this way, the level of radiation used for the transmission of data is not substantially reduced for the area necessary for the transmitter and/or receiver, whereas the radiation cannot traverse the rest of the surface of the glazing. Moreover, the radiation does not cause any of the perturbations mentioned above.

The glazing outside of the delimited region preferably reflects and/or absorbs not only electromagnetic radiation used by the transmitter and/or receiver, but also all other radiation outside of the visible portion of the spectrum. Such an effect can, for example, be obtained by means of appropriate surface coatings, in particular by a thin transparent metallic layer. Thus, it is possible to protect the enclosed space from perturbing or harmful radiation.

In a first variant of this invention, the transmitter and/or receiver operates within the infrared portion of the spectrum and the entire glazing, with the exception of the area for the passage of infrared radiation, is provided with a layer capable of reflecting and/or absorbing such radiation.

This variant has the advantage of enabling the use of transmitting and/or receiving systems which are well proven while minimizing heating of the enclosed space by the infrared part of the solar radiation. This first variant is relatively simple to achieve, because the known glazing itself has a relatively good capacity for transmitting infrared radiation. It is therefore sufficient to apply an additional layer designed to reflect and/or absorb infrared radiation, except for the surface region intended to permit transmission of radiation.

The first variant can also be formed so that the glazing is provided and comprises in the delimited surface area for the passage of radiation carrying data, with a reflecting layer for infrared radiation but which again allows radiation to pass through this delimited area with the intermission of an additional anti-reflective layer. This kind of anti-reflective layer is well known and is distinguished in that it has for the relevant wavelength which we will call lambda, a thickness equivalent to a quarter of lambda or to one of its odd numbered multiples.

A second variant of the invention is distinguished in that the transmitter and/or receiver covers the range of microwaves and in that the glazing, which itself is very reflective in this range of spectrum has a thickness adapted to enable microwave radiation to be transmitted through the delimited surface region provided for the passage of said radiation.

Electromagnetic waves known as microwaves have a wavelength less than 10 centimeters. However, it is known that glazings currently in use are in fact opaque to such wavelengths. That is why transmitters and receivers working with this type of radiation are generally found on the exterior of closed spaces. The invention enables transmitters and receivers to be placed within such a space, even for microwave radiation, because it enables a precise area of the window to be made transparent to this kind of light by increasing the thickness of the window pane. According to the invention, a glazing transmits, within a precise area, wavelengths of a length lambda if the thickness of the glazing is of the order of a half lambda or odd numbered multiples thereof. For example, if a transmitter and/or receiver is required to perform at a frequency of 5.8 GH$_z$, that is at a wavelength of 5.1 cm, the ability for the glazing to transmit will be at a maximum when the thickness of the latter is 9.8 cm in the delimited surface area provided for the passage of the radiation.

In order to put into practice the invention for microwave radiation, a second sheet of glass may be stuck onto a first sheet of glass in the delimited area in order to achieve the desired thickness. In this case, the adhesive layer which fixes the second sheet of glass on the first, and any other intermediate layers or adhesives included in the glazing, should be formed from materials which have the same refractive index as that of the two layers of glass for the required wavelength, so that the glazing is dielectrically homogenous in the delimited area and produces no phase difference.

It is also possible to provide a cut out in the delimited area of the glazing, for example by following a circular contour and to fit one sheet of glass with a desired thickness in the void formed and stuck to the wall of the hole. This variant does not cause any phase difference from the interior of the body of glass so that it is not necessary to take any particular measures as regards the intermediate and adhesive layers.

For all the variants of the invention, the different properties of transmission and of reflection of the two areas are normally distinguishable in the visible range of the spectrum, that is, they can be seen by the naked eye, even if it is only to a small extent. So as to mitigate this effect and to give a homogenous appearance to the glazing, around and within the surface area capable of the greatest transmissivity for radiation from the transmitter and/or to the receiver and to reduce the visibility of the transmitter and/or receiver, the delimited part of the surface of the glazing may be provided with a sheet or layer for absorbing light, the light transmissivity of which is lower than 30%. For a laminated glass the absorbtion can be controlled to the desired values appropriately and by means of materials which have the ability to absorb light and which are present in a thermoplastic layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partially broken away view of a laminated glass pane adapted for the transmission of infrared radiation; and FIG: 2 is a cross-section view of the windscreen shown in FIG. 1, provided with an integrated transmitter and receiver.

DESCRIPTION OF THE PREFERRED EMBODIMENTS

Referring now to the drawings, wherein like reference numerals designate identical or corresponding parts throughout the several views, and more particularly to FIG. 1 thereof, the laminated pane shown is used as an automobile windscreen. On the inside of the latter are placed a transmitter and a receiver for infrared radiation having a wavelength of, for example, 860 nm. The pane has four layers: an inner sheet of glass 1, a layer 3 for reflecting infrared radiation, an intermediate thermoplastic layer 10 and an outer sheet of glass 32.

On the innermost side, i.e., that which faces the occupants of the vehicle, is the sheet of glass 1. The sheet 1 may be made from a current float glass. Sheet 1 has in its border areas, on the innermost side, an opaque coating about 2 mm thick, in the form of a frame 2 and formed from enamel baked onto the glass.

On the surface of glass sheet 1 which is orientated toward the outside, and adjacent the intermediate thermoplastic layer 10, a multiple layer 3 is deposited by a cathodic sputtering process. The multiple layer 3 can, for example, be formed from (1) an anti-reflective zinc oxide layer having a thickness of 35 nm and placed on the surface of the glass sheet 1, (2) a layer of silver 15 nm thick, and (3) another anti-reflective layer 35 nm thick, each layer being adhered to the preceding layer.

The multiple layer 3 covers the whole surface of the glass sheet 1, excepting the delimited area 8. A sheet of float glass with such a multiple layer only has, for wavelengths of 860 nm for example, a transmissivity of about 30%, which means that 70% of the infrared radiation of this wavelength is reflected or absorbed by the multiple layer.

To prevent the multiple layer 3 from covering the surface area 8 during the coating process, it is possible to cover this area 8 with an adhesive sheet which is subsequently removed. Alternatively, one can first deposit the coating over the entire surface and then eliminate it from the relevant zone, for example by means of a localized plasma attack. As the transmissivity of float glass without any coating is about 80% for 860 nm radiation, the intensity of radiation of such a wavelength used for transferring data is only reduced to a limited extent.

The intermediate layer 10, which is joined to the multiple layer 3, is formed from a sheet of known polyvinyl butyryl having a thickness of 0.76 mm. This layer 10 has in its upper part a band filter 11. This band filter is distinguished from other regions of the intermediate thermoplastic sheet by organic coloring substances having been added to this area of the sheet. Surprisingly, known band filters for this sheet have, in the visible range of the light spectrum, a transmissivity lower than 30% while the present invention exceeds 90% for the relevant range of infrared transmission. The band filter 11 extends to the outer edge of the glass. It covers zone 8 as well as the adjacent areas of the surface of the pane which have been coated.

The coloring of the filter 11 is gradually increased in a transition zone between lower edge 12 of the band filter and line 13. The delimited zone 8 is located in the area of the filter having maximum coloring.

Because of its great ability to absorb light in the invisible range, the band filter 11 renders the delimited area 8, as well as the transmitter and/or receiver located behind it, largely invisible to the naked eye. The small fraction of light which traverses the band filter illuminates area 8 and the devices which cover it. Likewise, only a small part of this fraction is reflected, a part which is again attenuated by its passage through the filter. Consequently, even if the reflectivity in the visible spectrum of the area delimited by the band filter is greatly superior or less than that of the outer areas, an observer would only notice a very minimal difference in the level of reflectivity for a transmissivity of the filter of 30%. Thus, this area is hardly noticeable.

The transmissivity of the band filter for visible light can have values greater than 30% but should not exceed 40%. On the other hand, reducing the transmissivity of filter 11 to values down to about 10% only slightly limits the efficiency of the infrared transmitters and receivers. When a band filter containing organic coloring substances is used, the absorbtion zones of which are in the visible light range, the transmissivity of infrared radiation can exceed 75% for laminated glass so equipped, despite the great absorbtion in this range.

With such a figure, even for radiation crossing the glazing twice, in the case where the transmitter and receiver are disposed in the interior of the closed space, the band filter 11 only reduces the intensity of the infrared radiation by about one half of the original value, which is normally perfectly acceptable.

FIG. 2 shows the structure of a windscreen designed for the transmission of data and directly fitted with a transmitter 20 and a receiver 21. The transmitter 20 and receiver 21, as well as electronic circuitry 24, are located together in an opto-electronic functional element and placed in housing 19. The housing 19 is in contact with face 4 of glass sheet 1, face 4 facing towards the interior of the vehicle, by means of flange 22 and adhesive layers 23. The electromagnetic radiation transmitted by transmitter 20 traverses region 8 of the glazing. Similarly, radiation from the outside is directed through it to the receiver 21.

The construction of the transmitter and receiver depends on the choice of the user. For example, transmitter 20 and receiver 21 may each have a photodiode 25 or 26. These can have regions 27 and 28 with N type conductors, as well as regions 29 and 30 with P type conductors. The four regions 27 to 30 are all connected to processing circuit 24 by means of electrical leads 35. Light is emitted by the transmitter 20, in the transition region between N type region 27 and P type region 29 of photodiode 25. Circuit 24 can be connected to a computer (not shown) in the vehicle by means of cables 36 and 37.

The transition region between N type region 27 and P type region 29 of photodiode 25 is at the focal point of the lens 41, with the result that the rays of light 42 emitted form from the lens form a bundle of parallel rays 43.

The light rays 46 transmitted from outside the vehicle are concentrated by lens 47 into a bundle 48 which converges at the focal point of the lens. This focal point is on the surface of photodiode 26.

FIG. 2 shows a combination of a transmitter and receiver designed for electromagnetic radiation in the infrared range and which can be concentrated by means of the lenses. But it is also possible, according to the invention, to use glazings with transmitters and/or receivers designed for other wavelengths, for example ultra-violet or microwave radiation.

It is further possible to otherwise arrange the transmitter and receiver, for example on a surface of the dashboard or on the back of the rear view mirror. In this case, the radiation can reach the glazing zones which are transparent to it either directly or indirectly. It is also possible for the transmitters and/or receivers to be disposed at a certain distance from the glazing with optical fiber cables conveying the transmitted and/or received radiation.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A glazing for an enclosed space, comprising:

at least one sheet of glass having a precisely delimited surface region; and at least one of a transmitter and a receiver for electromagnetic radiation in a non-visible portion of the spectrum, said at least one of a transmitter and a receiver being positioned for respectively transmitting and receiving radiation in a non-visible portion of the spectrum via said precisely delimited surface region, wherein the transmissivity of said precisely delimited surface region for electromagnetic radiation in said non-visible portion of the spectrum is higher than the transmissivity of a remainder of said at least one sheet of glass for electromagnetic radiation in said non-visible portion of the spectrum.

2. The glazing according to claim 1, wherein said at least one sheet of glass, other than said precisely delimited surface region, is provided with a layer which reduces the transmissivity of electromagnetic radiation in said non-visible portion of the spectrum.

3. The glazing according to claim 2, wherein said non-visible portion of the spectrum comprises the infrared range and wherein said layer which reduces the transmissivity of electromagnetic radiation comprises a reflective layer for infrared radiation and an anti-reflective layer for infrared radiation in said precisely delimited surface region.

4. The glazing according to claim 1, wherein said non-visible portion of the spectrum comprises microwaves, wherein said at least one sheet of glass is reflective for microwaves, and wherein said precisely delimited surface region has a thickness increased by about one half, or an odd numbered multiple of one half, of the wavelength of the microwaves.

5. The glazing according to any one of claims 1 to 4, including, at least in said precisely delimited surface region, a visible light absorbent sheet or layer having a transmissivity of visible light lower than 40%.

6. The glazing according to any one of claims 1 to 4, wherein the at least one of a transmitter and a receiver is located on a surface of the glazing at said precisely delimited surface region.

7. The glazing according to claim 6, wherein the receiver has an integrated electronic circuit capable interpreting signals from the receiver.

8. The glazing according to any one of claims 1 to 4, including a fiber optic cable connecting said at least one of a transmitter and a receiver to said precisely delimited surface region.

* * * * *